(12) United States Patent
Ouf et al.

(10) Patent No.: US 10,384,194 B2
(45) Date of Patent: Aug. 20, 2019

(54) COMPOSITE HOLLOW PARTICLE, A METHOD FOR MAKING THEREOF, AND A METHOD FOR PRODUCING HYDROGEN GAS

(71) Applicant: King Abdulaziz University, Jeddah (SA)

(72) Inventors: Reda Mohamedy Mohamed Ouf, Jeddah (SA); Mohammad W. Kadi, Jeddah (SA); Ibraheem Ahmed Mkhalid, Jeddah (SA)

(73) Assignee: King Abdulaziz University, Jeddah (SA)

( * ) Notice: Subject to any disclaimer, the term of this patent is extended or adjusted under 35 U.S.C. 154(b) by 287 days.

(21) Appl. No.: 15/377,557

(22) Filed: Dec. 13, 2016

(65) Prior Publication Data
US 2018/0161762 A1 Jun. 14, 2018

(51) Int. Cl.
| | | |
|---|---|---|
| *B01J 23/75* | (2006.01) | |
| *B01J 35/00* | (2006.01) | |
| *B01J 35/08* | (2006.01) | |
| *B01J 35/10* | (2006.01) | |
| *B01J 37/00* | (2006.01) | |
| *B01J 37/08* | (2006.01) | |
| *C01B 3/22* | (2006.01) | |

(Continued)

(52) U.S. Cl.
CPC ............. *B01J 23/75* (2013.01); *B01J 19/127* (2013.01); *B01J 21/063* (2013.01); *B01J 35/004* (2013.01); *B01J 35/0013* (2013.01); *B01J 35/08* (2013.01); *B01J 35/1019* (2013.01); *B01J 35/1057* (2013.01); *B01J 35/1061* (2013.01); *B01J 37/0018* (2013.01); *B01J 37/086* (2013.01); *C01B 3/22* (2013.01); *C01B 2203/0277* (2013.01); *C01B 2203/1052* (2013.01); *C01B 2203/1223* (2013.01)

(58) Field of Classification Search
CPC ........ B01J 23/75; B01J 19/127; B01J 21/063; B01J 35/0013; B01J 35/004; B01J 35/08; B01J 35/1019; B01J 35/1057; B01J 35/1061; B01J 37/0018; B01J 37/086; C01B 3/22
See application file for complete search history.

(56) References Cited

U.S. PATENT DOCUMENTS

2003/0181535 A1* 9/2003 Van Hardeveld .... B01J 37/0221
502/325

FOREIGN PATENT DOCUMENTS

| CN | 101428220 B | 9/2011 |
| CN | 102234133 A | 11/2011 |

(Continued)

OTHER PUBLICATIONS

Zhang et. al., Synthesis, Characterization and Photocatalytic Property of Magnetic Titania Hollow sphere Composition, Advanced Materials Research, 298, 188-192 (Year: 2011).*

(Continued)

*Primary Examiner* — James A Fiorito
(74) *Attorney, Agent, or Firm* — Oblon, McClelland, Maier & Neustadt, L.L.P.

(57) ABSTRACT

A composite hollow particle comprising titanium dioxide and a metal ion in the shell which covers a hollow core. A method of making the composite hollow particle and a method of employing the composite hollow particle in production of hydrogen gas under visible light are provided.

22 Claims, 16 Drawing Sheets

(51) Int. Cl.
    *B01J 19/12*     (2006.01)
    *B01J 21/06*     (2006.01)

(56) References Cited

FOREIGN PATENT DOCUMENTS

| CN | 102302933 B | 12/2013 |
| CN | 104707641 A | 6/2015 |
| JP | 2015009238 A * | 1/2015 |

OTHER PUBLICATIONS

JP 2015009238 (Machine Translation) (Year: 2015).*
L. Mahoney, et al., "Solar simulated hydrogen evolution using cobalt oxide nanoclusters deposited on titanium dioxide mesoporous materials prepared by evaporation induced self-assembly process" International Journal of Hydrogen Energy, Sep. 15, 2014, vol. 40, Issue. 34, pp. 10795-10806.
T.T Le, et al., "Water splitting on Rhodamine-B dye sensitized Co-doped TiO2 catalyst under visible light" Applied Catalysis B: Environmental, Jan. 12, 2012, vol. 111-112, pp. 397-401.
M. Yin, et al.,"A noble-metal-free photocatalytic hydrogen production system based on cobalt(III) complex and eosin Y-sensitized TiO2" RSC Advances, vol. 5, Issue. 3, 2015, pp. 1852-1858.

* cited by examiner

COMPOSITE HOLLOW PARTICLE, A METHOD FOR MAKING THEREOF, AND A METHOD FOR PRODUCING HYDROGEN GAS

BACKGROUND OF THE DISCLOSURE

Technical Field

The present disclosure relates to a composite hollow particle, a method for making thereof, and a method for producing hydrogen gas.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Photocatalysis has attracted interest in many fields of scientific research and industrial applications. In photocatalysis, a catalyst is used in reactions which are irradiated with ultraviolet (UV) or visible light. The use of visible radiation allows researchers to conduct reactions in an environmentally friendly fashion. Scientists are interested in designing photocatalysts with an energy band gap which falls within the frequencies of visible light. Other required properties of the photocatalysts include nontoxicity, stability, the potential to be recycled and reused, ease of separation, favorable magnetic and electric properties along with other characteristics depending on the application required.

Titanium dioxide is widely used as a photocatalyst as it possesses properties that include chemical stability, nontoxicity, the potential to be recycled and reused, the potential to be doped with other materials, and favorable physical properties. However, its wide band gap ($E_g$=3.2 eV) makes it compatible with reactions that involve UV light, which constitutes about 3-5% of the solar spectrum. Therefore, the structure of titanium dioxide has been manipulated to narrow the band gap to make the derived material active in the natural or artificial sunlight (Applied Catalysis A: General 495 (2015) 131-140, incorporated herein by reference in its entirety).

Titanium dioxide hollow spheres have attracted attention due to their structure, and several approaches have been developed for their synthesis (Particuology 22 (2015) 13-23, incorporated herein by reference in its entirety). Yan et al. fabricated titanium dioxide hollow spheres through a template-free solvothermal route and applied it to the degradation of rhodamine (J Mater Sci: Mater Electron (2016) 27:4068-4073, incorporated herein by reference in its entirety). Eiden and Maret reported the synthesis of titanium dioxide hollow spheres consisting exclusively of a crystalline rutile structure (Journal of Colloid and Interface Science 250, 281-284 (2002), incorporated herein by reference in its entirety). Wang et al. prepared anatase titanium dioxide hollow microspheres using styrene-acrylic acid copolymer latex particles as a template and characterized these spheres (Materials Letters 60 (2006) 77-80, incorporated herein by reference in its entirety). Lei et al. prepared titanium dioxide hollow spheres via a facile hydrothermal method without the use of any template and demonstrated improved performance in dye-sensitized solar cells (Electrochimica Acta 143 (2014) 129-134, incorporated herein by reference in its entirety). Zhang et al. reported the controlled fabrication of nano-sized titanium dioxide hollow sphere particles via acid catalytic hydrolysis/hydrothermal treatment and tested the catalyst on the removal of phenol (Powder Technology 212 (2011) 145-150, incorporated herein by reference in its entirety). Fing et al. reported a catalyst-free hydrothermal method for the preparation of titanium dioxide hollow spheres (Applied Surface Science 257 (2010) 756-761, incorporated herein by reference in its entirety). Lin et al. reported the synthesis of hollow spherical titanium dioxide for dye-sensitized solar cells and demonstrated the enhanced light harvesting efficiency of the structure (Applied Surface Science 263 (2012) 816-820, incorporated herein by reference in its entirety). Wang et al. reported the synthesis of titanium dioxide hollow microspheres with a mesoporous surface via a facile template-assisted solvothermal reaction and demonstrated a superior adsorption performance for dye removal (Applied Surface Science 305 (2014) 352-358, incorporated herein by reference in its entirety). Ye et al. reported hydrothermal synthesis of titanium dioxide hollow microspheres for the photocatalytic degradation of 4-chloronitrobenzene (Journal of Hazardous Materials 184 (2010) 612-619, incorporated herein by reference in its entirety).

Titanium dioxide composite hollow spheres which have a variety of crystal structures and various dopants are also of interest. Zhang et al. prepared hollow core-shell cerium(IV) oxide/titanium dioxide photocatalysts via precipitation-co-hydrothermal method and applied it in the removal of rhodamine B as a model dye pollutant (J Mater Sci (2015) 50:5228-5237, incorporated herein by reference in its entirety). Fang et al. prepared hollow carbon-doped titanium dioxide composite spheres through a template-assisted method and illustrated its potential in the development of electrophoretic ink (J Mater Sci: Mater Electron (2016) 27:6115-6121, incorporated herein by reference in its entirety). Qu et al. prepared titanium dioxide and Gd(III)/titanium dioxide hollow spheres with Gd doping with the assistance of the carbon sphere templates and demonstrated the hollow spheres had enhanced photocatalytic activity (J Sol-Gel Sci Technol (2015) 76:699-707, incorporated herein by reference in its entirety). Liu et al. synthesized hybrid titanium dioxide hollow spheres using tetrabutyl titanate and hydrated metal sulfates as soft templates in a solvothermal method and reported the hollow spheres to have excellent efficiency and durability in photo-decomposition of methyl orange (MO) under visible-light irradiation (Front. Mater. Sci. 2016, 10(1): 15-22, incorporated herein by reference in its entirety). Geng et al. reported a facile route for the controllable design of fluorine-doped carbon-treated titanium dioxide hollow spheres with mesoporous shells for improved lithium storage (Electrochimica Acta 157 (2015) 1-7, incorporated herein by reference in its entirety). Zhang et al. reported preparing carbon-coated titanium dioxide hollow composite spheres with enhanced visible photocatalytic performance in the degradation of rhodamine B dye (Applied Surface Science 286 (2013) 344-350, incorporated herein by reference in its entirety). Cho et al. reported the preparation and photocatalytic activity of nitrogen-doped titanium dioxide hollow nanospheres (Journal of Physics and Chemistry of Solids 72 (2011) 1462-1466, incorporated herein by reference in its entirety). Wang et al. reported one-step template-free fabrication of mesoporous zinc oxide/titanium dioxide hollow microspheres and demonstrated the enhanced photocatalytic activity on degradation of methyl orange (Applied Surface Science 307 (2014) 263-271, incorporated herein by reference in its entirety). Tang et al. reported the synthesis of $\alpha$-$Fe_2O_3$/titanium dioxide composite hollow spheres by a template-assisted precipitation reaction and the activity of the catalyst was tested in the photocatalytic decolorization of rhodamine B aqueous solution (Ceramics International 39 (2013) 8633-8640, incorporated herein by reference in its entirety). Li et al. synthesized tungsten(VI) oxide/titanium dioxide composite hollow sphere photocatalyst using a template method and demonstrated improved photocatalytic activity (Journal of Hazardous Materials 189 (2011) 329-335, incorporated herein by reference in its entirety). Chattopadhyay et al. studied hydrogen production with tin-doped titanium dioxide hollow spheres (International Journal of Hydrogen Energy 33 (2008) 3270-3280, incorporated herein by reference in its entirety). Zhang et al. developed an in-situ synthesis of carbon-doped titanium dioxide hollow spheres with high photocatalytic activity (Applied catalysis B: Environmental 165 (2015) 715-722, incorporated herein by reference in its entirety).

In an effort to produce clean and environmentally friendly energy, scientists have shown great interest in the production of hydrogen from water splitting using various materials (Top Catal (2008) 49:4-17; and J. Chem. Sci. Vol. 127, No. 1, January 2015, pp. 33-47, each incorporated herein by reference in their entirety). Titanium dioxide is an important material in this area because of the aforementioned properties and research has been conducted in attempts to manipulate the properties of titanium dioxide to enhance its ability in the water splitting reactions. Scientists synthesized materials of various crystal structures and different morphologies for hydrogen production (Journal of Wuhan University of Technology-Mater. Sci. Ed. October 2015, Vol. 30 No. 5; Rare Metals, Vol. 30, Spec. Issue, March 2011, p. 280; Nano Research 2015, 8(4): 1199-1209; Sci China Mater 2015, 58: 363-369; Catal Lett (2015) 145:1771-1777; Mater Renew Sustain Energy (2014) 3:25; Russian Journal of Inorganic Chemistry, 2014, Vol. 59, No. 4, pp. 291-297; Catal Lett (2014) 144:340-346; Catal Lett, DOI 10.1007/s10562-016-1790-x; Catal Sury Asia (2012) 16:231-239; and J Mater Sci (2014) 49:6383-6391, each incorporated herein by reference in their entirety). The synthesis of a material could also impact the properties of the product (Reac Kinet Mech Cat (2014) 112:559-572, incorporated herein by reference in its entirety).

Therefore, an objective of this disclosure is to provide a titanium dioxide/metal ion composite hollow particle, a method of making thereof, and a method of photocatalytic water splitting.

BRIEF SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

A first aspect of the disclosure relates to a composite hollow particle, comprising a shell comprising titanium dioxide and at least one metal ion selected from the group consisting of vanadium(II), vanadium(III), chromium(II), chromium(III), manganese(II), cobalt(II), cobalt(III), nickel (II), and copper(II), where the shell covers a hollow core, a crystallite size of the titanium dioxide is in a range of 1-20 nm, the metal ion is located in the shell, the composite hollow particle is mesoporous with an average pore size in a range of 1-10 nm and has a BET surface area in a range of 100-200 m$^2$/g.

In one embodiment, an average shell thickness is in a range of 5-45 nm and an average core diameter is in a range of 100-300 nm.

In one embodiment, the titanium dioxide is in an anatase phase.

In one embodiment, the composite hollow particle does not contain zinc(II) and/or cadmium(II).

In one embodiment, the composite hollow particle comprises 1-40 wt % of the metal ion, based on a total weight of the composite hollow particle.

In one embodiment, the metal ion is cobalt(II).

In one embodiment, the composite hollow particle does not contain ferrite.

A second aspect of the disclosure relates to a method for producing the composite hollow particle of the first aspect, the method comprising: (i) dissolving a tetraalkyl titanate compound and a metal salt in a solvent comprising nitric acid, an alcohol, and water, thereby forming a first mixture, (ii) mixing the first mixture with cyclohexylamine thereby forming a second mixture, and (iii) heating the second mixture in an autoclave thereby forming the composite hollow particle.

In one embodiment, the second mixture is heated at a temperature in a range of 60-100° C. for 12-48 hours.

In one embodiment, the tetraalkyl titanate compound is selected from the group consisting of tetrabutyl titanate, tetramethyl titanate, tetraethyl titanate, tetraisopropyl titanate, and tetrakis(2-ethylhexyl) titanate.

In one embodiment, the metal salt is a cobalt salt selected from the group consisting of cobalt(II) chloride, cobalt(II) acetate, cobalt(II) nitrate, cobalt(II) sulfate, cobalt(II) bromide, cobalt(II) iodide, and hydrates thereof.

In one embodiment, an amount of the metal salt is in a range of 10-50 mol %, based on a number of moles of the tetraalkyl titanate compound.

In one embodiment, a volume of the nitric acid is in a range of 1-20 vol %, based on a volume of the water.

In one embodiment, an amount of the cyclohexylamine is in a range of 5-30 mol %, based on a number of moles of the tetraalkyl titanate compound.

A third aspect of the disclosure relates to a method for producing hydrogen gas, the method comprising: (i) mixing the composite hollow particle of the first aspect with a solution comprising water and an alcohol thereby forming a slurry, and (ii) irradiating the slurry with light with a wavelength in a range of 385-740 nm, thereby producing hydrogen gas.

In one embodiment, an amount of the composite hollow particle in the slurry is in a range of 0.1-5 g/L.

In one embodiment, the alcohol is methanol.

In one embodiment, the solution comprises up to 30 vol % of the alcohol, based on a total volume of the solution.

In one embodiment, the hydrogen gas is produced at a rate in a range of 50-300 μmol/h per gram of the composite hollow particle.

In one embodiment, the method further comprises: (i) recovering the composite hollow particle after the hydrogen gas is produced; and (ii) recycling the recovered composite hollow particle, which maintains photocatalytic activity after being recycled for at least 4 reaction cycles.

DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figures 1A, 1B:
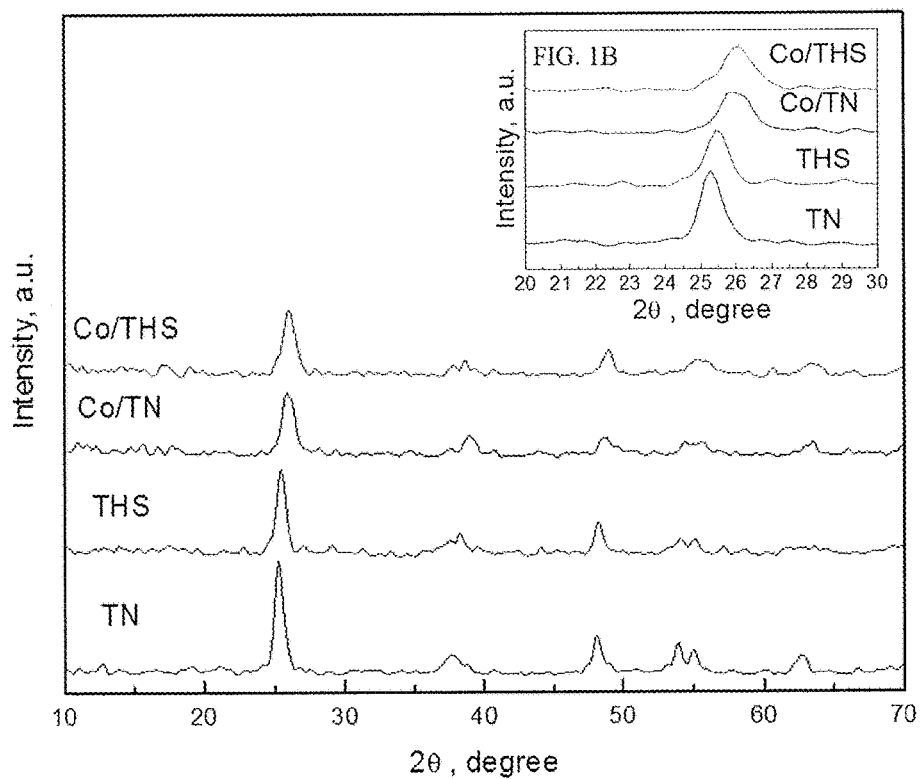
FIG. 1A is an overlay of the XRD patterns of titanium dioxide nanoparticles (TN), cobalt-doped titanium dioxide nanoparticles (Co/TN), titanium dioxide hollow spheres (THS), and cobalt-doped titanium dioxide hollow spheres (Co/THS).
FIG. 1B is a close-up view of FIG. 1A from 20°-30°.
Figure 2A:
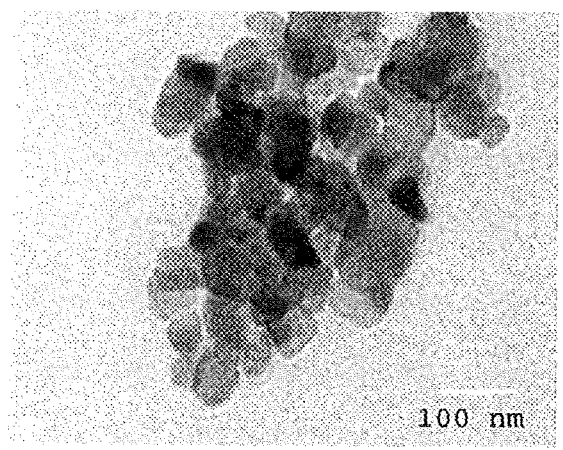
FIG. 2A is a TEM micrograph of titanium dioxide nanoparticles.
Figure 2B:
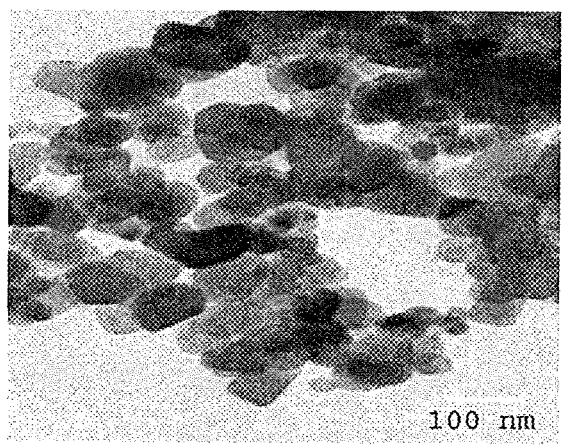
FIG. 2B is a TEM micrograph of cobalt-doped titanium dioxide nanoparticles.
Figure 2C:
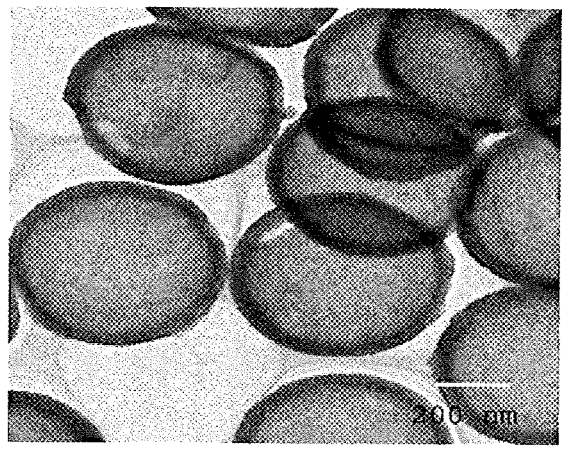
FIG. 2C is a TEM micrograph of titanium dioxide hollow spheres.
Figure 2D:
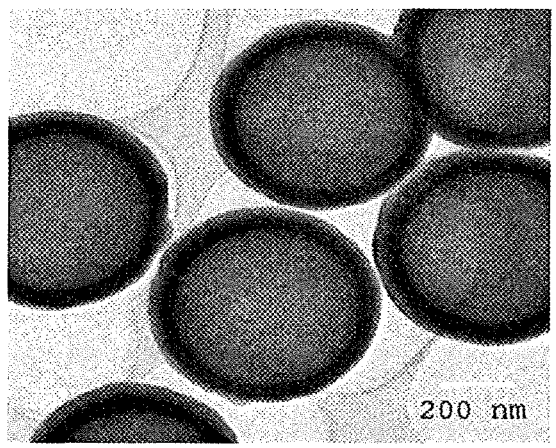
FIG. 2D is a TEM micrograph of cobalt-doped titanium dioxide hollow spheres.

Embodiments of the present disclosure will now be described more fully hereinafter with reference to the accompanying drawings, in which some, but not all of the embodiments of the disclosure are shown.

The present disclosure will be better understood with reference to the following definitions.

As used herein, the words "a" and "an" and the like carry the meaning of "one or more". Within the description of this disclosure, where a numerical limit or range is stated, the endpoints are included unless stated otherwise. Also, all values and subranges within a numerical limit or range are specifically included as if explicitly written out.

The term "alkyl", as used herein, unless otherwise specified, refers to a straight or branched hydrocarbon fragment. Non-limiting examples of such hydrocarbon fragments include methyl, ethyl, propyl, isopropyl, butyl, isobutyl, t-butyl, pentyl, isopentyl, neopentyl, hexyl, isohexyl, 3-methylpentyl, 2,2-dimethylbutyl, and 2,3-dimethylbutyl. As used herein, the term "cycloalkyl" refers to a cyclized alkyl group. Exemplary cycloalkyl groups include, but are not limited to, cyclopropyl, cyclobutyl, cyclopentyl, cyclohexyl, norbornyl, and adamantyl. Branched cycloalkyl groups, for example, 1-methylcyclopropyl and 2-methycyclopropyl groups, are included in the definition of cycloalkyl as used in the present disclosure.

The term "alkenyl" refers to a straight, branched, or cyclic hydrocarbon fragment containing at least one C=C double bond. Exemplary alkenyl groups include, without limitation, 1-propenyl, 2-propenyl (or "allyl"), 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, 5-hexenyl, 1-heptenyl, 2-heptenyl, 3-heptenyl, 4-heptenyl, 5-heptenyl, 6-heptenyl, 1-octenyl, 2-octenyl, 3-octenyl, 4-octenyl, 5-octenyl, 6-octenyl, 7-octenyl, 1-nonenyl, 2-nonenyl, 3-nonenyl, 4-nonenyl, 5-nonenyl, 6-nonenyl, 7-nonenyl, 8-nonenyl, 1-decenyl, 2-decenyl, 3-decenyl, 4-decenyl, 5-decenyl, 6-decenyl, 7-decenyl, 8-decenyl, and 9-decenyl.

The term "aryl", as used herein, and unless otherwise specified, refers to phenyl, biphenyl, naphthyl, anthracenyl, and the like. The term "heteroaryl" refers to an aryl group where at least one carbon atom is replaced with a heteroatom (e.g. nitrogen, oxygen, sulfur) and can be indolyl, furyl, imidazolyl, triazolyl, triazinyl, oxazolyl, isoxazolyl, thiazolyl, isothiazolyl, pyrazolyl, pyrrolyl, pyrazinyl, tetrazolyl, pyridyl (or its N-oxide), thienyl, pyrimidinyl (or its N-oxide), 1H-indolyl, isoquinolyl (or its N-oxide), or quinolyl (or its N-oxide), for example.

As used herein, the term "substituted" refers to at least one hydrogen atom that is replaced with a non-hydrogen group, provided that normal valencies are maintained and that the substitution results in a stable compound. When a compound or a R group is noted as "optionally substituted", the substituents are selected from the exemplary group including, but not limited to, aroyl (as defined hereinafter); halogen (e.g. chlorine, bromine, fluorine or iodine); alkoxy (i.e. straight or branched chain alkoxy having 1 to 10 carbon atoms, and includes, for example, methoxy, ethoxy, propoxy, isopropoxy, butoxy, isobutoxy, sec-butoxy, tert-butoxy, pentoxy, isopentoxy, hexyloxy, heptyloxy, octyloxy, nonyloxy, and decyloxy);

cycloalkyloxy including cyclopentyloxy, cyclohexyloxy, and cycloheptyloxy; aryloxy including phenoxy and phenoxy substituted with halogen, alkyl, alkoxy, and haloalkyl (which refers to straight or branched chain alkyl having 1 to 8 carbon atoms which are substituted by at least one halogen, and includes, for example, chloromethyl, bromomethyl, fluoromethyl, iodomethyl, 2-chloroethyl, 2-bromoethyl, 2-fluoroethyl, 3-chloropropyl, 3-bromopropyl, 3-fluoropropyl, 4-chlorobutyl, 4-fluorobutyl, dichloromethyl, dibromomethyl, difluoromethyl, diiodomethyl, 2,2-dichloroethyl, 2,2-dibromoethyl, 2,2-difluoroethyl, 3,3-dichloropropyl, 3,3-difluoropropyl, 4,4-dichlorobutyl, 4,4-difluorobutyl, trichloromethyl, trifluoromethyl, 2,2,2-tri-fluoroethyl, 2,3,3-trifluoropropyl, 1,1,2,2-tetrafluoroethyl, 2,2,3,3-tetrafluoropropyl); hydrocarbyl; arylalkyl; hydroxy; alkoxy; oxo; alkanoyl; alkanoyloxy; amino; alkylamino; arylamino; arylalkylamino; disubstituted amines (e.g. in which the two amino substituents are selected from the exemplary group including, but not limited to, alkyl, aryl, or arylalkyl); alkanoylamino; thiol; alkylthio; arylthio; arylalkylthio; alkylthiono; arylthiono; aryalkylthiono; alkylsulfonyl; arylsulfonyl; arylalkylsulfonyl; sulfonamido (e.g. —$SO_2NH_2$); substituted sulfonamide; nitro; cyano; carboxy; carbamyl (e.g. —CONH$_2$, —CONHalkyl, —CONHaryl, —CONHarylalkyl or cases where there are two substituents on one nitrogen from alkyl, aryl, or arylalkyl); alkoxycarbonyl; aryl; heteroarylcarbonyl; heterocyclyl; and mixtures thereof and the like. The substituents may be either unprotected, or protected as necessary, as known to those skilled in the art, for example, as taught in Greene, et al., "Protective Groups in Organic Synthesis", John Wiley and Sons, Second Edition, 1991, hereby incorporated by reference in its entirety).

The term "heterocyclyl" as used in this disclosure refers to a 3-8, preferably 4-8, more preferably 4-7 membered monocyclic ring or a fused 8-12 membered bicyclic ring which may be saturated or partially unsaturated, which monocyclic or bicyclic ring contains 1 to 4 heteroatoms selected from oxygen, nitrogen, silicon, or sulfur. Examples of such monocyclic rings include oxaziridinyl, homopiperazinyl, oxiranyl, dioxiranyl, aziridinyl, pyrrolidinyl, azetidinyl, pyrazolidinyl, oxazolidinyl, piperidinyl, piperazinyl, morpholinyl, thiomorpholinyl, thiazolidinyl, hydantoinyl, valerolactamyl, oxiranyl, oxetanyl, dioxolanyl, dioxanyl, oxathiolanyl, oxathianyl, dithianyl, dihydrofuranyl, tetrahydropyranyl, dihydropyranyl, tetrahydropyranyl, tetrahydropyridyl, tetrahydropyrimidinyl, tetrahydrothiophenyl, tetrahydrothiopyranyl, diazepanyl, and azepanyl. Examples of such bicyclic rings include indolinyl, isoindolinyl, benzopyranyl, quinuclidinyl, 2,3,4,5-tetrahydro-1,3,benzazepine, 4-(benzo-1,3,dioxol-5-methyl)piperazine, and tetrahydroisoquinolinyl. Further, "substituted heterocyclyl" may refer to a heterocyclyl ring which has additional (e.g. one or more) oxygen atoms bonded to the ring atoms of parent heterocyclyl ring. An example of a heterocyclyl substituted with one or more oxygen atoms is 1,1-dioxido-1,3-thiazolidinyl.

The term "alkylthio" as used in this disclosure refers to a divalent sulfur with alkyl occupying one of the valencies and includes the groups methylthio, ethylthio, propylthio, butylthio, pentylthio, hexylthio, and octylthio.

The term "alkanoyl" as used in this disclosure refers to an alkyl group having 2 to 18 carbon atoms that is bound with a double bond to an oxygen atom. Examples of alkanoyl include, acetyl, propionyl, butyryl, isobutyryl, pivaloyl, valeryl, hexanoyl, octanoyl, lauroyl, and stearoyl.

Examples of aroyl are benzoyl and naphthoyl, and "substituted aroyl" may refer to benzoyl or naphthoyl substituted by at least one substituent including those selected from halogen, amino, nitro, hydroxy, alkyl, alkoxy and haloalkyl on the benzene or naphthalene ring.

The term "arylalkyl" as used in this disclosure refers to a straight or branched chain alkyl moiety having 1 to 8 carbon atoms that is substituted by an aryl group or a substituted aryl group having 6 to 12 carbon atoms, and includes benzyl, 2-phenethyl, 2-methylbenzyl, 3-methylbenzyl, 4-methylbenzyl, 2,4-dimethylbenzyl, 2-(4-ethylphenyl)ethyl, 3-(3-propylphenyl)propyl.

The term "heteroarylcarbonyl" as used in this disclosure refers to a heteroaryl moiety with 5 to 10 membered mono- or fused-heteroaromatic ring having at least one heteroatom selected from nitrogen, oxygen and sulfur as mentioned above, and includes, for example, furoyl, nicotinoyl, isonicotinoyl, pyrazolylcarbonyl, imidazolylcarbonyl, pyrimidinylcarbonyl, and benzimidazolyl-carbonyl. Further, "substituted heteroarylcarbonyl" may refer to the above mentioned heteroarylcarbonyl which is substituted by at least one substituent selected from halogen, amino, vitro, hydroxy, alkoxy and haloalkyl on the heteroaryl nucleus, and includes, for example, 2-oxo-1,3-dioxolan-4-ylmethyl, 2-oxo-1,3-dioxan-5-yl.

Vinyl refers to an unsaturated substituent having at least one unsaturated double bond and having the formula CH$_2$═CH—. Accordingly, said "substituted vinyl" may refer to the above vinyl substituent having at least one of the protons on the terminal carbon atom replaced with alkyl, cycloalkyl, cycloalkylalkyl, aryl, substituted aryl, heteroaryl or substituted heteroaryl.

The term "hydrocarbyl" as used herein refers to a univalent hydrocarbon group containing up to about 24 carbon atoms (i.e. a group containing only carbon and hydrogen atoms) and that is devoid of olefinic and acetylenic unsaturation, and includes alkyl, cycloalkyl, alkyl-substituted cycloalkyl, cycloalkyl-substituted cycloalkyl, cycloalkylalkyl, aryl, alkyl-substituted aryl, cycloalkyl-substituted aryl, arylalkyl, alkyl-substituted aralkyl, and cycloalkyl-substituted aralkyl. Further, functionally-substituted hydrocarbyl groups may refer to a hydrocarbyl group that is substituted by one or more functional groups selected from halogen atoms, amino, nitro, hydroxy, hydrocarbyloxy (including alkoxy, cycloalkyloxy, and aryloxy), hydrocarbylthio (including alkylthio, cycloalkylthio, and arylthio), heteroaryl, substituted heteroaryl, alkanoyl, aroyl, substituted aroyl, heteroarylcarbonyl, and substituted heteroarylcarbonyl.

The present disclosure is further intended to include all isotopes of atoms occurring in the present compounds. Isotopes include those atoms having the same atomic number but different mass numbers. By way of general example, and without limitation, isotopes of hydrogen include deuterium and tritium. Isotopes of carbon include $^{13}$C and $^{14}$C. Isotopically labeled compounds of the disclosure can generally be prepared by conventional techniques known to those skilled in the art or by processes and methods analogous to those described herein, using an appropriate isotopically labeled reagent in place of the non-labeled reagent otherwise employed.

The first aspect of the disclosure relates to a composite hollow particle, comprising a shell comprising titanium dioxide and a metal ion, where the shell surrounds a hollow core. The shell surrounds no less than 50%, no less than 70%, no less than 80%, preferably about 100% of the core. The shape of the core generally determines the shape of the composite hollow particle. In a preferred embodiment, the composite hollow particle is spherical or substantially spherical (e.g. oval or oblong shape). In other embodiments, the composite hollow particle can be of any shape that provides desired photocatalytic activity. In some embodiments, the composite hollow particle is in the form of at least one shape such as a sphere, a rod, a cylinder, a rectangle, a triangle, a pentagon, a hexagon, a prism, a disk, a platelet, a cube, a cuboid, and an urchin (e.g. a globular particle possessing a spiky uneven surface).

The composite hollow particles may be uniform. As used herein, the term "uniform" refers to no more than 10%, no more than 5%, no more than 4%, no more than 3%, no more than 2%, or no more than 1% of the distribution of the composite hollow particles having a different shape. For example, the composite hollow spheres are uniform and have no more than 1% of composite hollow particles in an oblong shape. In some embodiments, the composite hollow particles may be non-uniform. As used herein, the term "non-uniform" refers to more than 10% of the distribution of the composite hollow particles having a different shape.

Dispersity is a measure of the heterogeneity of sizes of molecules or particles in a mixture. In probability theory and statistics, the coefficient of variation (CV), also known as relative standard deviation (RSD) is a standardized measure of dispersion of a probability distribution. It is expressed as a percentage and is defined as the ratio of the standard deviation ($\sigma$) of to the mean ($\mu$, or its absolute value $|\mu|$). The CV or RSD is widely used to express precision and repeatability. It shows the extent of variability in relation to the mean of a population. The composite hollow particles having a narrow size dispersion, i.e. monodispersity, is preferred. As used herein, "monodisperse", "monodispersed" and/or "monodispersity" refers to composite hollow particles having a CV or RSD of less than 25%, preferably less than 20%.

The composite hollow particles may be monodisperse with a coefficient of variation or relative standard deviation (ratio of the particle size standard deviation to the particle size mean) of less than 15%, less than 12%, less than 10%, less than 9%, less than 8%, less than 7%, less than 6%, less than 5%, or preferably less than 2%.

In one embodiment, the composite hollow particles are monodisperse and have a particle diameter distribution in a range of 75% of the average particle diameter to 125% of the average particle diameter, 80-120%, 85-115%, 86-114%, 87-113%, 88-112%, 89-111%, 90-110%, or preferably 95-105% of the average particle diameter.

A diameter of the particle, as used herein, refers to the longest linear distance measured from one point on the particle through the center of the particle to a point directly across from it.

The average diameter of the composite hollow particle may be in a range of 110-390 nm, 160-330 nm, 200-270 nm, preferably 200-260 nm. In some embodiments, the average diameter of the composite hollow particle is in a range of 50-93%, 55-93%, 60-93%, 65-93%, 70-93%, 75-93%, 80-93%, or preferably 85-93% of the average diameter of a non-doped titanium dioxide hollow particle. The average shell thickness is in a range of 5-45 nm, 5-40 nm, 10-35 nm, preferably 15-35 nm. In a preferred embodiment, the shell is of uniform thickness. Alternatively, the shell may be of non-uniform thickness. The term "uniform thickness" refers to an average shell thickness that differs by no more than 5%, no more than 4%, no more than 3%, no more than 2%, or preferably no more than 1% at any given location on the shell. The term "non-uniform thickness" refers to an average shell thickness that differs by more than 5% at any given location on the shell.

The average core diameter is in a range of 100-300 nm, 150-250 nm, 180-220 nm, 185-195 nm, preferably 189-191 nm. The composite hollow particle may be agglomerated or, preferably, non-agglomerated (i.e. the composite hollow particles are well separated from one another and do not form clusters).

The composite hollow particle may be mesoporous or microporous. The term "microporous" means a structure having an average pore diameter of less than 2 nm. The term "mesoporous" means a structure having an average pore diameter of 2-50 nm. An average pore size of the composite hollow particle may be in a range of 1-10 nm, 1-5 nm, 1-3 nm, preferably 1.5-2.5 nm. A porosity of the composite hollow particle may be in a range of 0.5-95 vol %, 0.5-80 vol %, 0.5-70 vol %, 0.5-60 vol %, 0.5-50%, 5-50 vol %, 10-50 vol %, 10-40 vol %, 10-30 vol %, or preferably 10-20 vol %, based on a total volume of the composite hollow particle. The composite hollow particle may have a BET surface area in a range of 100-200 m$^2$/g, 100-160 m$^2$/g, 140-160 m$^2$/g, or preferably 150-160 m$^2$/g.

The titanium dioxide may be crystalline or polycrystalline. Preferably, the titanium dioxide is nanocrystalline with a crystallite size in a range of 1-20 nm, 5-15 nm, 7-12 nm, or preferably 9-11 nm. The titanium dioxide may be in an anatase phase, a rutile phase, a brookite phase, or a combination thereof. Preferably, the titanium dioxide is in an anatase phase. In some embodiments, the titanium dioxide may comprise at least 1 wt %, at least 5 wt %, at least 10 wt %, up to 40 wt %, up to 30 wt %, up to 25 wt %, up to 20 wt % of a rutile phase, based on a weight of the anatase phase. The proportion of each phase may be determined from the XRD pattern. In some embodiments, the amount of the rutile phase is below the detection limit (e.g. about 3 wt %) of the XRD equipment. In some embodiments, the titanium dioxide is amorphous (i.e. lacking a crystalline structure).

The metal ion may be at least one of vanadium(II), vanadium(III), chromium(II), chromium(III), manganese (II), cobalt(II), cobalt(III), nickel(II), copper(II), zinc(II), molybdenum(II), molybdenum(III), molybdenum(IV), molybdenum(V), molybdenum(VI), gold(I), gold(III), platinum(II), platinum(IV), niobium(III), niobium(IV), niobium (V), tungsten(I), tungsten(II), tungsten(III), tungsten(IV), tungsten(V), tungsten(VI), ruthenium(II), ruthenium(III), and ruthenium(IV). Preferably, the metal ion is cobalt(II). In one embodiment, the composite hollow particle does not contain ferrite. In some embodiments, the composite hollow particle does not contain zinc(II) and/or cadmium(II). In a further embodiment, the composite hollow particle does not contain nickel(II), copper(II), manganese(II) and/or chromium(VI). In some embodiments, the composite hollow particle does not contain fluorine, elemental carbon, and/or elemental nitrogen. The composite hollow particle may comprise 1-40 wt %, 1-35 wt %, 1-30 wt %, 1-25 wt %, 1-20 wt %, 1-15 wt %, 1-10 wt %, or preferably 1-5 wt % of the metal ion, based on a total weight of the composite hollow particle. In some embodiments, the composite hollow particle comprises up to 5 wt %, up to 4.5 wt %, up to 4 wt %, up to 3.5 wt %, up to 3 wt %, up to 2.5 wt %, up to 2 wt %, up to 1.5 wt %, up to 1.4 wt %, up to 1.3 wt %, up to 1.2 wt %, or up to 1.1 wt %. In a preferred embodiment, the composite hollow particle comprises 1-40 wt %, 1-35 wt %, 1-30 wt %, 1-25 wt %, 1-20 wt %, 1-15 wt %, 1-10 wt %, or preferably 1-5 wt % of the cobalt(II) ion, based on a total weight of the composite hollow particle.

The titanium dioxide and the metal ion may be located in the shell. In one embodiment, the metal ion is incorporated into the lattice structure of titanium dioxide. For example, the metal ion may be embedded between titanium dioxide molecules to become integral with the lattice or the metal ion may be embedded into the pores of the titanium dioxide lattice and thus not integral to the titanium dioxide lattice. In another embodiment, the metal ion is not incorporated into the lattice structure of titanium dioxide and may be adsorbed on the surface (e.g. by van der Waals and/or electrostatic forces) of the composite hollow particle.

In one embodiment, the shell consists of titanium dioxide and cobalt(II) ions.

A surface roughness of the surface of the composite hollow particle may range from 0.01-2 nm, 0.01-1 nm, 0.01-0.5 nm, 0.01-0.4 nm, 0.05-0.4 nm, 0.05-0.3 nm, 0.05-0.2 nm, preferably 0.05-0.1 nm.

The composite hollow particles may have a band gap value in the range of 2-2.88 eV, 2.1-2.85 eV, 2.2-2.8 eV, 2.3-2.75 eV, 2.4-2.75 eV, 2.5-2.75 eV, 2.6-2.75 eV, 2.7-2.75 eV, or preferably 2.71-2.73 eV.

The dimensions of the particle, shell, and/or core, and the amount of metal ion may vary from these ranges and the composite hollow particles can still function as intended.

The second aspect of the disclosure relates to a hydrothermal method for producing the composite hollow particle, the method comprising: (i) dissolving a tetraalkyl titanate compound and a metal salt in a solvent comprising nitric acid, an alcohol, and water, thereby forming a first mixture, (ii) mixing the first mixture with cyclohexylamine thereby forming a second mixture, and (iii) heating the second mixture in an autoclave thereby forming the composite hollow particle. The method may be conducted as a batch or continuous process. "Continuous", as used herein, refers to a method used to produce materials without interruption or where the reactants are flowed and/or are in motion during a chemical reaction.

The second mixture may be heated at a temperature in a range of 60-100° C., 60-90° C., 65-90° C., 70-90° C., or preferably 75-85° C. for 12-48 hours, 15-40 hours, 15-35 hours, 15-30 hours, or preferably 20-30 hours. The second mixture may be stirred (e.g. at a speed of 50-1,000 rpm, 50-900 rpm, 50-700 rpm, 50-500 rpm, 100-500 rpm, preferably 200-400 rpm) or left to stand while heated.

After the heating, the autoclave may be left to cool to a temperature in a range of 10-40° C., 10-30° C., or preferably 20-30° C. The composite hollow particles may be collected/washed/dried by methods known to those of ordinary skill in the art. For example, the composite hollow particles may be collected by filtering the cooled second mixture, washed with solvents, such as water and ethanol, and dried in an oven at a temperature in a range of 60-100° C., 60-90° C., 65-90° C., 70-90° C. at a pressure of 0.001-10 mbar, 0.001-5 mbar, 0.001-2 mbar, 0.001-1 mbar, or preferably 0.001-0.5 mbar for 5-20 hours, 5-15 hours, or preferably 7-12 hours.

The alkyl group in the tetraalkyl titanate compound may be optionally substituted. In one embodiment, the alkyl group in the tetraalkyl titanate compound is an unsubstituted alkyl and the tetraalkyl titanate compound is tetrabutyl titanate, tetramethyl titanate, tetraethyl titanate, or tetraisopropyl titanate. In one embodiment, the alkyl group in the tetraalkyl titanate compound is a substituted alkyl and the tetraalkyl titanate compound is tetrakis(2-ethylhexyl) titanate. Preferably, the tetraalkyl titanate compound is tetrabutyl titanate. An amount of the tetraalkyl titanate compound may be in a range of 0.01-0.5 moles, 0.01-0.4 moles, 0.01-0.3 moles, 0.01-0.2 moles, 0.01-0.1 moles, preferably 0.01-0.05 moles. In some embodiments, a concentration of the tetraalkyl titanate compound is in range of 0.01-10 M, 0.01-9 M, 0.01-8 M, 0.01-7 M, 0.01-6 M, 0.01-5 M, 0.01-4 M, 0.01-3 M, 0.01-2 M, 0.01-1 M, or preferably 0.1-1 M, relative to the first mixture.

Exemplary metal salts include, halides (e.g. fluoride, chloride, bromide, and iodide), nitrates, acetylacetonates, acetates, perchlorates, sulfamates, trifluoroacetylacetonates, carbonates, and sulfates of vanadium, chromium, manganese, cobalt, nickel, copper, zinc, molybdenum, gold, platinum, niobium, tungsten, and ruthenium. In most embodiments, the metal salt is a hydrate. In a preferred embodiment, the metal salt is a cobalt salt such as cobalt(II) chloride, cobalt(II) acetate, cobalt(II) nitrate, cobalt(II) sulfate, cobalt(II) bromide, cobalt(II) iodide, and hydrates thereof. Preferably, the metal salt is cobalt(II) nitrate hexahydrate.

An amount of the metal salt may be in a range of 10-50 mol %, 10-40 mol %, 10-30 mol %, preferably 15-25 mol %, based on a number of moles of the tetraalkyl titanate compound. In some embodiments, the amount of the metal salt is up to 9 mol %, up to 8 mol %, up to 7 mol %, up to 6 mol %, up to 5 mol %, up to 4 mol %, or preferably up to 3 mol %.

Exemplary alcohols include, without limitation, methanol, ethanol, trifluoroethanol, n-propanol, i-propanol, n-butanol, i-butanol, t-butanol, n-pentanol, i-pentanol, 2-methyl-2-butanol, 2-trifluoromethyl-2-propanol, 2,3-dimethyl-2-butanol,3-pentanol, 3-methyl-3-pentanol, 2-methyl-3-pentanol, 2-methyl-2-pentanol, 2,3-dimethyl-3-pentanol, 3-ethyl-3-pentanol, 2-methyl-2-hexanol, 3-hexanol, cyclopropylmethanol, cyclopropanol, cyclobutanol, cyclopentanol, and cyclohexanol. Preferably the alcohol is ethanol.

A volume of the water (e.g. tap water, distilled water, doubly distilled water, deionized water, and deionized distilled water) is in a range of 0.1-20 vol %, 0.1-15 vol %, 0.5-15 vol %, 1-15 vol %, 2-15 vol %, 3-15 vol %, 4-15 vol %, 5-15 vol %, 6-15 vol %, 7-15 vol %, 7-14 vol %, 7-13 vol %, 7-12 vol %, or preferably 7-11 vol %, based on a volume of the alcohol. The volume of the nitric acid is in a range of 1-20 vol %, 1-15 vol %, 5-15 vol %, 7-12 vol %, based on the volume of the water. A concentration of the nitric acid is in a range of 0.1-5 M, 0.1-4 M, 0.1-3 M, or preferably 0.5-2 M.

In some embodiments, a mineral acid (e.g. sulfuric acid, hydrochloric acid, phosphoric acid, and perchloric acid) or an organic acid (e.g. acetic acid, and triflic acid) is used in place of the nitric acid. Preferably, hydrochloric acid may be used in place of the nitric acid. In some embodiments, a mixture of acids comprising nitric acid is used. For example, a mixture of hydrochloric acid and nitric acid may be used, and the mixture may comprise up to 50 mol %, up to 40 mol %, up to 30 mol %, up to 20 mol %, or preferably up to 10 mol % of nitric acid, based on a number of moles of hydrochloric acid.

It is envisioned that other amines may be used in place of cyclohexylamine and the method will still produce composite hollow particles as intended. Exemplary amines include, without limitation, primary amine (e.g. $RNH_2$), a secondary amine ($R_2NH$), or a tertiary amine ($R_3N$). Each R group may independently be an optionally substituted alkyl, an optionally substituted cycloalkyl, an optionally substituted cycloalkylalkyl, an optionally substituted arylalkyl, an optionally substituted alkenyl, an optionally substituted heteroaryl, an optionally substituted aryl, an optionally substituted heterocyclyl, an optionally substituted arylolefin, or an optionally substituted vinyl. Preferably, the amine is a primary amine such as cyclohexylamine (R is cyclohexyl). Without being bound by theory, the size of the R group may affect the surface area of the composite hollow particle as the shell may be formed around the R group. For example, when cyclohexylamine is used, the surface area of the composite hollow particle may be in a range of 100-200 $m^2/g$, 100-160 $m^2/g$, 140-160 $m^2/g$, or preferably 150-160 $m^2/g$.

An amount of the amine is in a range of 5-30 mol %, 5-25 mol %, 5-20 mol %, 10-20 mol %, or preferably 10-15 mol %, based on the number of moles of the tetraalkyl titanate compound.

The amine may be in a salt form or a neutral form and may be adsorbed onto the surface of the shell, and/or in the pores. The salt form and/or the neutral form of the amine may interact with the surface of the shell and/or the pores via hydrogen bonds (e.g. the proton on the ammonium or the amino hydrogen atom may interact with the oxygen atom on the surface of the shell/pore). In another embodiment, the nitrogen atom of the neutral form of the amine interacts covalently or electrostatically with the titanium and/or the metal ions on the surface of the shell/pore.

In other embodiments, the amine may be used in combination with other surfactants (alkyl iminopropionate; (amido)betaines, for example, cocamidopropyl betaine and lauryl betaine; carboxylates; sulfonates; and phosphonates). For example, alkali metal (lithium, sodium, potassium, and cesium) salts of carboxylates may be mixed with the first mixture. In a preferred embodiment, sodium carboxylates are used. The carboxylate comprises at least one oxygen atom bound to the surface of the shell and/or the pores. In one embodiment, the carboxylate binds to the titanium ion and/or the metal ion located on the shell surface. The carboxylate may bind to the titanium ion and/or the metal ion in a monodentate manner covalently or electrostatically.

The carboxylate may be a carboxylate of a fatty acid with a chain length between 6 to 30 carbon atoms, preferably between 6 to 18 carbon atoms, polymeric carboxylates, amino carboxylates, and polyamino carboxylates. The carboxylates of fatty acids can be saturated, or unsaturated with a trans or cis geometry about the carbon-carbon double bond. Preferably the carboxylate is oleate, linoleate, linolenate, stearate, palmitate, laurate, caprate, or hexanoate. Non-limiting examples of polymeric carboxylates include carboxylates of polyacrylic acid, polymethacrylic acid, hyaluronic acid, carboxymethyl dextran and their acid-based derivatives, polylactic acid, poly(lactic-co-glycolic acid). Non-limiting examples of amino carboxylates include carboxylates of arginine, lysine, glutamic acid, and aspartic acid, and enantiomers thereof. Non-limiting examples of polyaminocarboxylates include carboxylates of polylysine, polyarginine, and polyornithine, and stereoisomers thereof.

In one embodiment, the method may be repeated to prepare composite hollow particles with a layered shell by using the composite hollow particles as a template. An amount of the composite hollow particles mixed into the first or second mixture may be in a range of 0.1-1 mg/ml, 0.1-0.9 mg/ml, 0.1-0.8 mg/ml, 0.1-0.7 ml, 0.1-0.6 mg/ml, or preferably 0.1-0.5 mg/ml of the first or second mixture. The composite hollow particles with a layered shell may optionally have a distinct interface between each layer. The second layer (the layer of shell further from the hollow core) may have the same thickness as the first layer. In some embodiments, the second layer has a thickness which is 0.1-10%, 0.1-7%, 0.1-5%, 0.1-3%, or preferably 0.1-1% thicker than the first layer. In some embodiments, the second layer has a thickness which is 0.1-10%, 0.1-7%, 0.1-5%, 0.1-3%, or preferably 0.1-1% thinner than the first layer.

The third aspect of the disclosure relates to a water splitting method for producing hydrogen gas, the method comprising (i) mixing the composite hollow particles of the first aspect with a solution comprising water and an alcohol thereby forming a slurry, and (ii) irradiating the slurry with light with a wavelength in a range of 385-740 nm, preferably 400-700 nm thereby producing hydrogen gas. The method may be conducted as a batch or continuous process. The slurry may be irradiated with a light source such as a xenon lamp, a mercurial lamp, a metal halide lamp, an LED lamp, a solar simulator, and a halogen lamp. Two or more light sources may be used. Sunlight may also be used as the light source.

The slurry may be shaken/stirred throughout the duration of the reaction by employing a rotary shaker, a magnetic stirrer, or an overhead stirrer. In another embodiment, the slurry is left to stand (i.e. not stirred). In one embodiment, the slurry is sonicated.

In one embodiment, the composite hollow particles are dispersed within the slurry mixture, and may further be filtered and recycled after the hydrogen gas stopped evolving. In one embodiment, the composite hollow particles are placed in a bag (preferably transparent) and the bag is immersed in the reaction mixture. Accordingly, the composite hollow particles remain in the bag until the coupling reaction is completed. A material that permits at least 50%, 75%, 80%, 90%, or 95% of light of any portion of the light spectrum to pass through the bag may be considered transparent.

An amount of the composite hollow particles in the slurry is in a range of 0.1-5 g/L, 0.1-4 g/L, 0.1-3 g/L, 0.1-2.5 g/L, or preferably 0.1-2 g/L. The hydrogen gas is produced at a rate in a range of 50-300 µmol/h per gram of the composite hollow particle, at least 60 µmol/h per gram, at least 70 µmol/h per gram, at least 80 µmol/h per gram, at least 90 µmol/h per gram, at least 100 µmol/h per gram, up to 290 µmol/h per gram, up to 280 µmol/h per gram, up to 270 µmol/h per gram, up to 260 µmol/h per gram, up to 250 µmol/h per gram, up to 240 µmol/h per gram, up to 230 µmol/h per gram, up to 230 µmol/h per gram, up to 220 µmol/h per gram, up to 210 µmol/h per gram.

The solution comprises up to 30 vol % of the alcohol, up to 25 vol %, up to 20 vol %, up to 15 vol %, preferably up to 12 vol %, based on a total volume of the solution. Preferably, the alcohol is methanol. Without wishing to be bound by theory, the alcohol may act as a scavenger during the photocatalytic splitting of water. The solution comprises water which may be tap water, distilled water, doubly distilled water, deionized water, deionized distilled water, or combinations thereof.

The method may be performed at a temperature in a range of 10-60° C., 10-50° C., 10-40° C., 10-30° C., or preferably 20-30° C. The method may be performed at a pressure in a range of 0.5-2 atm, 0.5-1.7 atm, 0.5-1.5 atm, 0.7-1.5 atm, or preferably 0.9-1.2 atm.

In some embodiments, the method further comprises: (i) recovering the composite hollow particles after the hydrogen gas is produced, and (ii) recycling the recovered composite hollow particle, which maintains photocatalytic activity after being recycled for at least 4 reaction cycles. The composite hollow particles may be separated by removing the bag of composite hollow particles, dialysis in a solvent, or using a micro-filter or a paper filter. The phrase "recycling the composite hollow particles" refers to a process whereby the composite hollow particles are first washed by an organic solvent, dried, and then added to a new solution. Preferred organic solvents for washing the composite hollow particles and/or dialysis may include, without limitation, methanol, acetone, ethanol, tetrahydrofuran, acetonitrile, dichloromethane, ether, glycol ether, acetamide, dimethyl acetamide, dimethyl sulfoxide, or combinations thereof. The composite hollow particles may be dried in vacuum, and/or with heating, for example, the catalyst may be dried in a vacuum oven. Dried composite hollow particles may be stored in a desiccator until the next run.

In one embodiment, the composite hollow particles are recycled for at least 4 runs, preferably at least 10 runs, more preferably at least 20 runs, even more preferably at least 30 runs. The average rate of hydrogen gas evolution may decrease less than 20%, preferably less than 10%, less than 5%, less than 4%, less than 3%, less than 2%, or more preferably less than 1% after the composite hollow particles are used for at least 4 runs, preferably at least 10 runs, more preferably at least 20 runs, even more preferably at least 30 runs.

The production of hydrogen gas may be measured by methods known to those of ordinary skill in the art such as gas chromatogram, a gas syringe, and displacement of water.

The composite hollow particles may be used to photodegrade organic pollutants such as pesticides (aldrin, chlordane, DDT, dieldrin, endrin, heptachlor, hexachlorobenzene, mirex, toxaphene), industrial chemicals (hexachlorobenzene, polychlorinated biphenyls (PCBs), methyl tertiary butyl ether), and by-products (hexachlorobenzene, polychlorinated dibenzo-p-dioxins, polychlorinated dibenzofurans).

Having generally described this disclosure, a further understanding can be obtained by reference to certain specific examples which are provided herein for purposes of illustration only and are not intended to be limiting unless otherwise specified.

Example 1 Preparation of Photocatalysts

Cobalt/titanium dioxide hollow spheres (Co/THS) were prepared by a hydrothermal method in which 8.0 g of tetrabutyl titanate and 1.5 g cobalt nitrate hexahydrate were dissolved in a mixed solvent (40 mL absolute ethanol+3 mL of distilled water+0.3 mL 1M $HNO_3$). The mixture was magnetically stirred for 30 min to allow complete dissolution. 0.3 g of cyclohexylamine was added and the solution was further stirred for 30 min. The mixture was transferred into Teflon-lined stainless steel autoclave, which was sealed and maintained at 80° C. for 24 h. After that, the autoclave was left to cool to room temperature. The product was filtered and washed with distilled water then ethanol for several times, then dried in vacuum at 80° C. for 10 h. Titanium dioxide hollow spheres (THS) were synthesized in the same fashion but in the absence of cobalt nitrate hexahydrate.

For comparison purposes cobalt/titanium dioxide nanoparticles (Co/TN) and titanium dioxide nanoparticles (TN) were prepared by the hydrothermal method. Co/TN was synthesized by dissolving 8.0 g of tetrabutyl titanate and 1.5 g cobalt nitrate hexahydrate in a mixed solvent containing 40 mL absolute ethanol, 3 mL of distilled water and 0.3 mL 1M $HNO_3$ under magnetic stirring for 30 min. The mixture was transferred into Teflon-lined stainless steel autoclave, which was sealed and maintained at 80° C. for 24 h. The autoclave was left to cool to room temperature and the product was filtered and washed with distilled water then ethanol for several times, and dried in vacuum at 80° C. for 10 h. Titanium dioxide nanoparticles were synthesized following the same procedure but in the absence of cobalt nitrate hexahydrate.

Example 2 Characterization of the Photocatalysts

In order to study the morphology, the material of interest was suspended in ethanol and sonicated for 30 minutes. A portion of the suspension was left to dry on a carbon coated copper grid and loaded into a JEOL-JEM-1230 transmission electron microscope (TEM). Surface area was obtained from $N_2$-adsorption measurements using a Nova 2000 series Chromatech apparatus at 77 K. The crystalline phase of the four samples was determined using Bruker axis D8 with Cu Kα radiation (λ=1.540 Å) at room temperature. A Thermo Scientific K-ALPHA spectrometer was utilized to obtain X-ray photoelectron spectroscopy (XPS) measurements. UV-visible diffuse reflectance spectra (UV-Vis-DRS) were used to obtain band gap information utilizing a UV-Vis-NIR spectrophotometer (V-570, Jasco, Japan) at room temperature. Absorption was measured over 200-800 nm. A Shimadzu RF-5301 fluorescence spectrophotometer was used to record photoluminescence emission spectra (PL).

FIGS. 1A and 1B show the overlay of the XRD patterns of the four synthesized samples, TN, Co/TN, THS, and Co/THS. The patterns reveal that pure titanium dioxide anatase phase is present in all four samples with no peaks of pure cobalt or cobalt oxides (possibly due to a low percentage of the cobalt present). The patterns also show a shift to right in peaks of Co/TN, and Co/THS which means cobalt ions were incorporated within the titanium dioxide lattice. The crystallite sizes of TN, Co/TN, THS, and Co/THS were 22 nm, 18 nm, 14 nm, and 10 nm, respectively, as calculated by the Scherrer formula. Doping titanium dioxide with cobalt results in a decrease of crystallite and hollow spheres sizes.

FIGS. 2A-2D show the TEM micrographs of TN, Co/TN, THS, and Co/THS samples. Co/TN and TN are spherical in shape with sizes of 130 and 160 nm, respectively. Co/THS and THS are hollow spheres with shell thicknesses of 15-35 nm and 20-45 nm, respectively, and core diameters of 190 nm and 240 nm, respectively. The addition of cobalt ion led to a smaller particle size in Co/THS and Co/TN samples.

Figure 3:
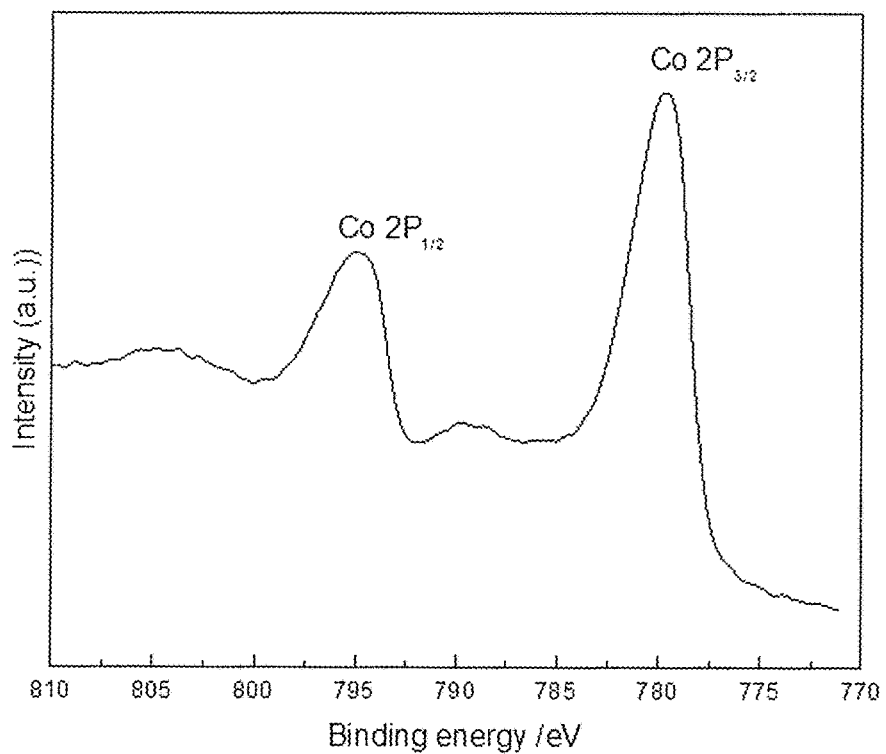
FIG. 3 is a XPS spectrum of Co 2p for cobalt-doped titanium dioxide hollow spheres.
Figure 4A:
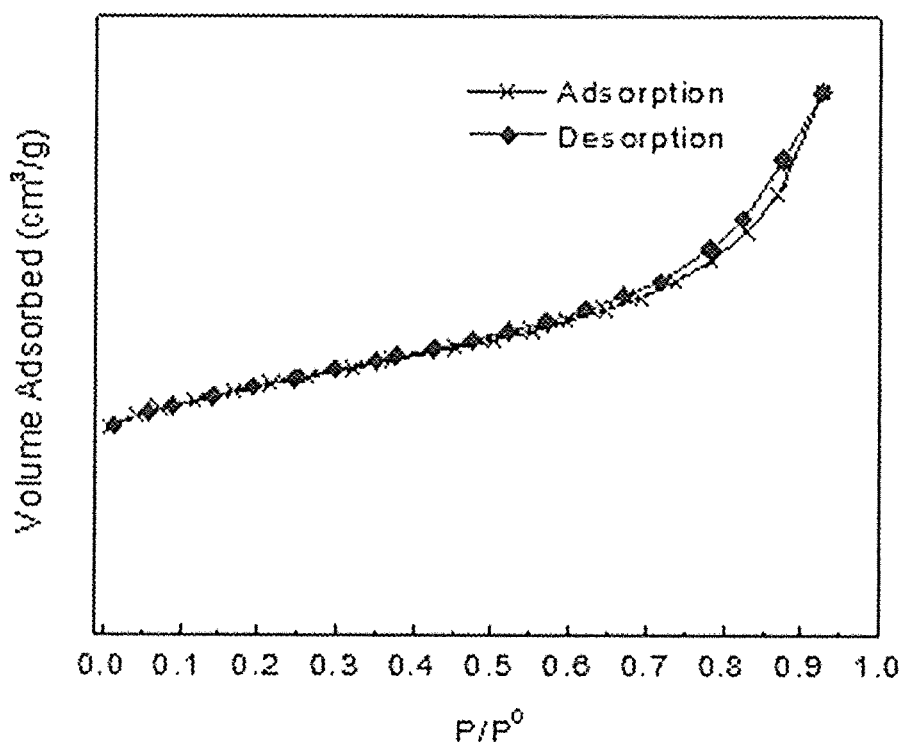
FIG. 4A is an adsorption-desorption isotherm of titanium dioxide nanoparticles.
Figure 4B:
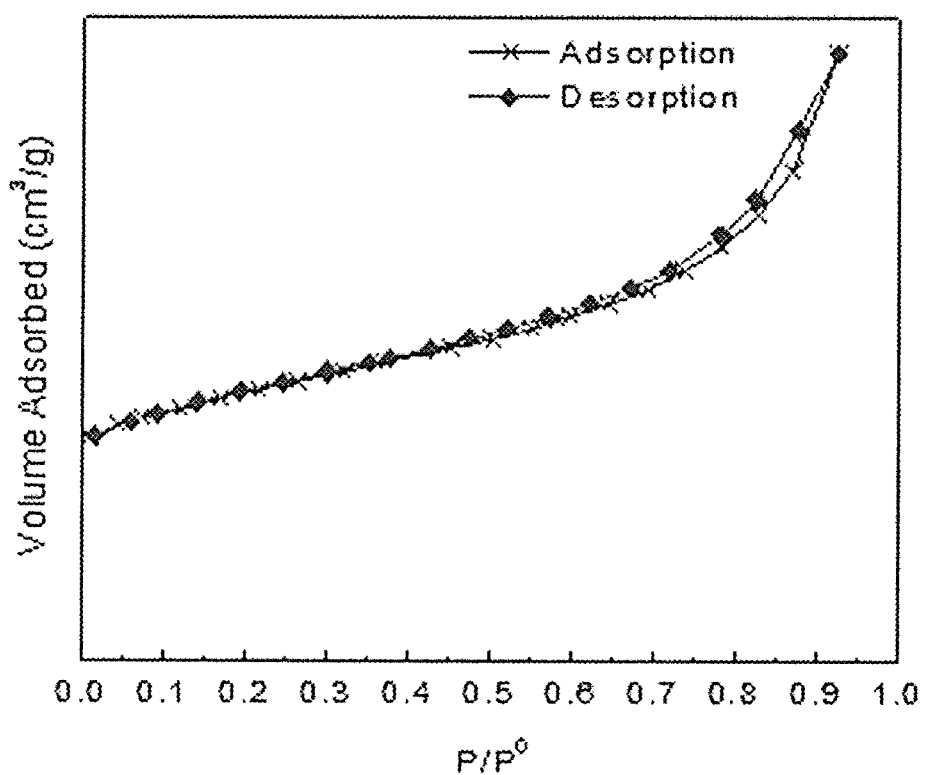
FIG. 4B is an adsorption-desorption isotherm of cobalt-doped titanium dioxide nanoparticles.
Figure 4C:
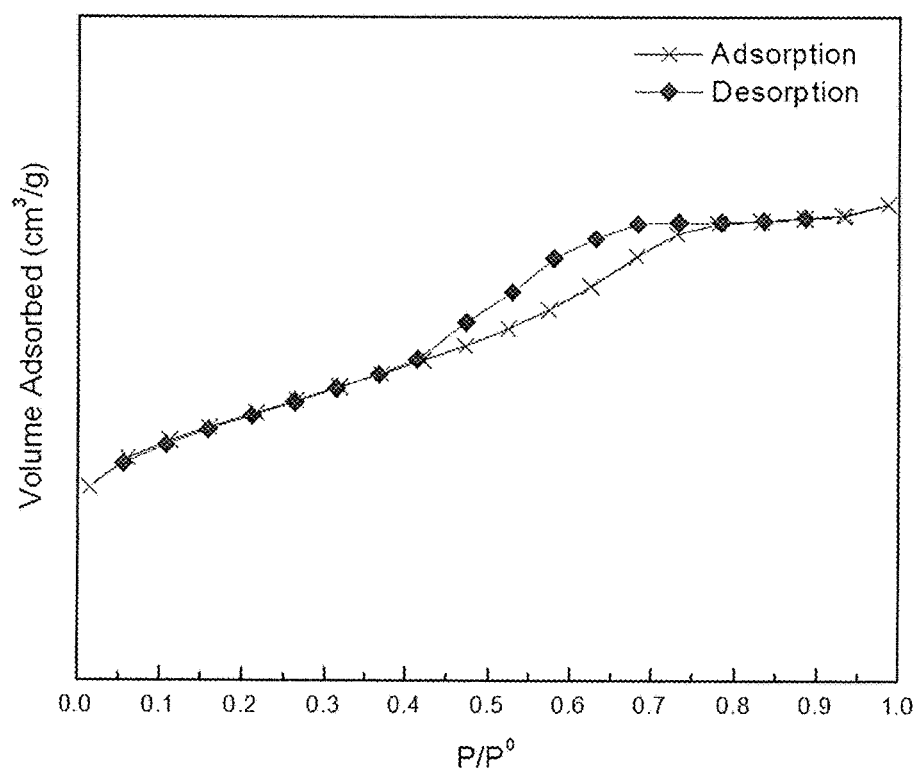
FIG. 4C is an adsorption-desorption isotherm of titanium dioxide hollow spheres.
Figure 4D:
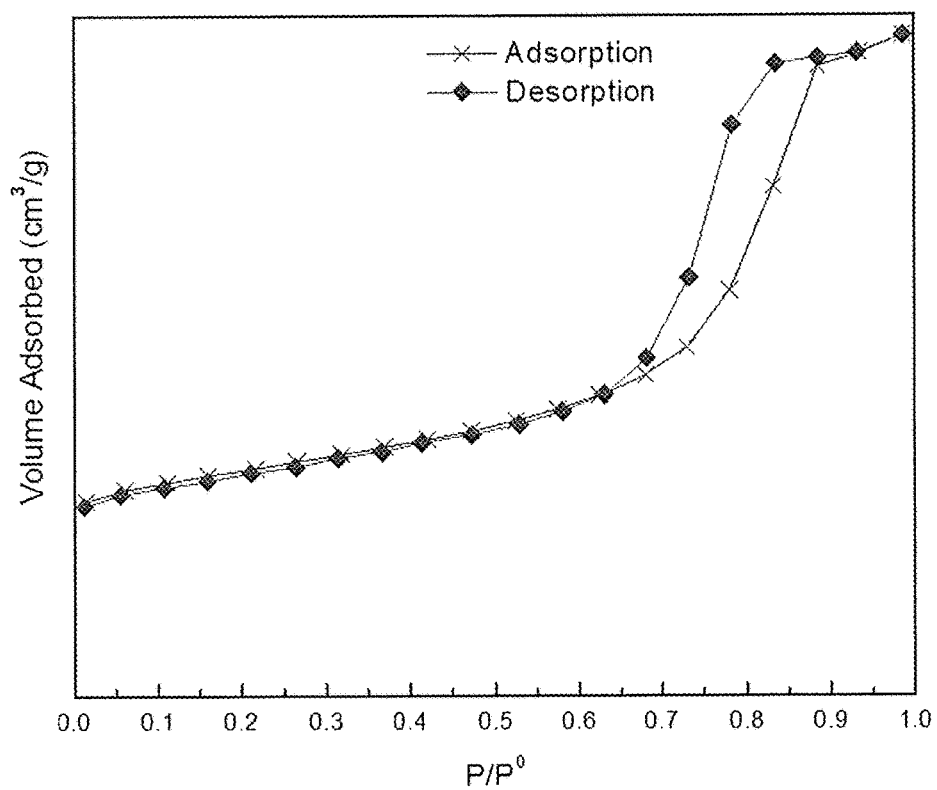
FIG. 4D is an adsorption-desorption isotherm of cobalt-doped titanium dioxide hollow spheres.

FIG. 3 shows the XPS spectrum of Co 2p in the Co/THS sample. The spectrum shows two peaks for Co $2p_{1/2}$ and Co $2p_{3/2}$ at 794.9 and 779.7 eV, respectively, confirming the presence of the cobalt ion ($Co^{2+}$ ion) and that it was incorporated into the titanium dioxide lattice.

FIGS. 4A-4D show the adsorption-desorption isotherms of TN, Co/TN, THS, and Co/THS samples. TN and Co/TN displayed an isotherm of type II, while THS and Co/THS displayed an isotherm of type IV. This data was interpreted as that samples THS and Co/THS are mesoporous materials.

Figure 5:
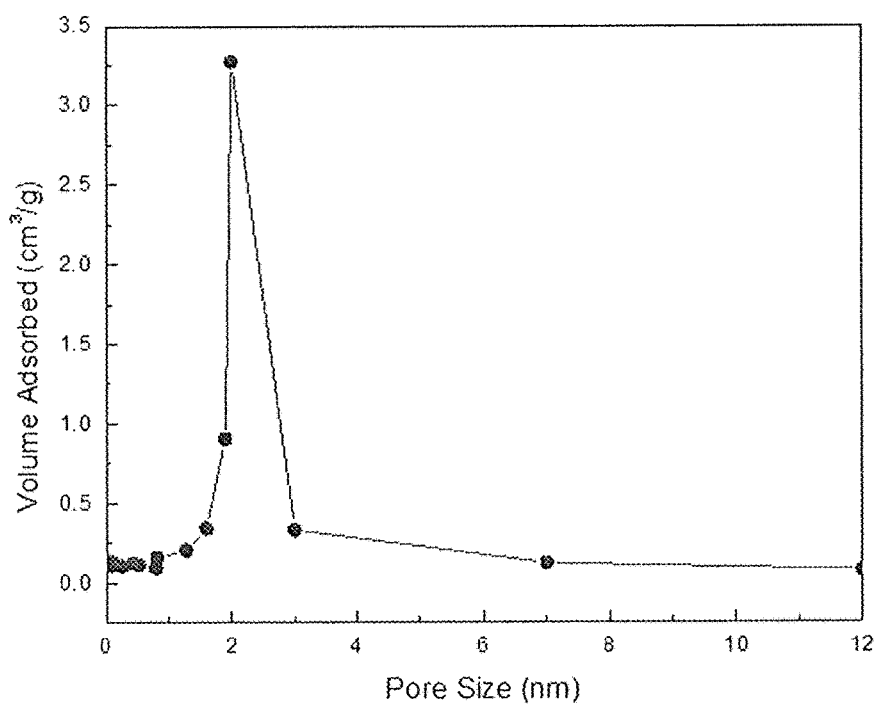
FIG. 5 shows the pore size distribution of cobalt-doped titanium dioxide hollow spheres.

The pore size distribution of Co/THS is shown in FIG. 5. It shows a very narrow distribution around 1.9 nm indicating that the composite hollow spheres may have a high surface area. The specific surface area of TN, Co/TN, THS, and Co/THS samples was measured by Nova 2000 resulting in values of 70, 80, 140 and 155 $m^2/g$, respectively. Therefore, the hollow sphere structure increased the BET surface area of titanium dioxide relative to titanium dioxide nanoparticles. These results show that there are two factors affecting the photocatalytic activity of titanium dioxide, namely the higher surface area due to hollow spherical structure and the presence of doped cobalt ion.

Figure 6:
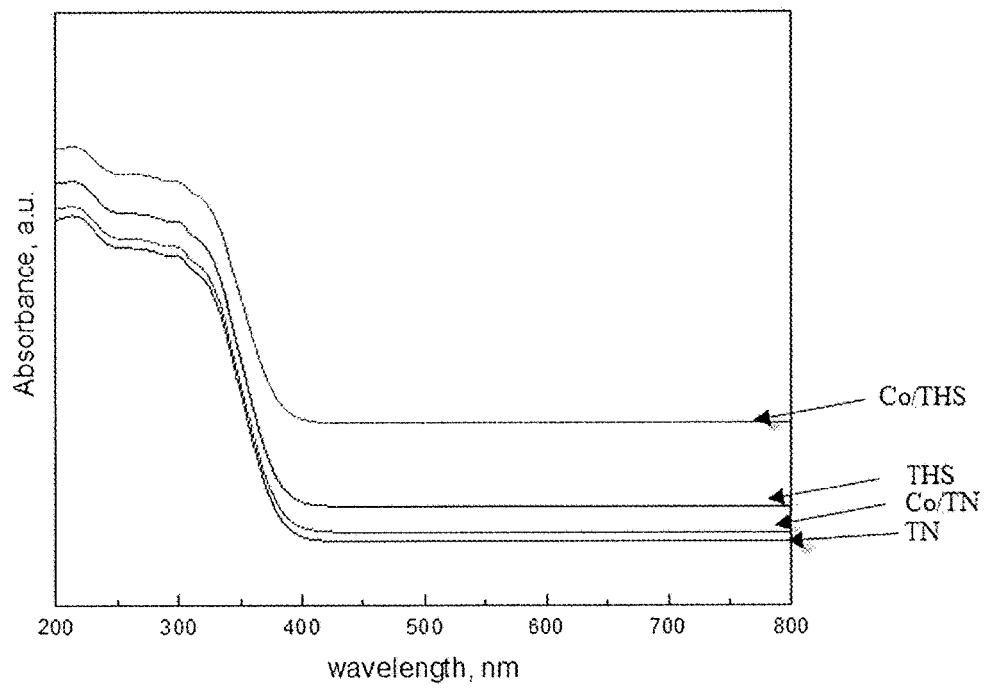
FIG. 6 is an overlay of the UV-Vis spectra of titanium dioxide nanoparticles (TN), cobalt-doped titanium dioxide nanoparticles (Co/TN), titanium dioxide hollow spheres (THS), and cobalt-doped titanium dioxide hollow spheres (Co/THS).

The UV-Vis spectra of TN, Co/TN, THS, and Co/THS samples (FIG. 6) reveal a red shift of absorption edges of titanium dioxide toward higher wavelengths going from nanoparticles to hollow spheres and also by presence of cobalt ion in the titanium dioxide lattice. The values of band gap energy of TN, Co/TN, THS, and Co/THS samples calculated from their respective UV-Vis spectra were 3.2 eV, 3.01 eV, 2.89 eV, and 2.72 eV, respectively, showing a narrowing in the band gap, which implied a more efficient visible light photocatalyst.

Figure 7:
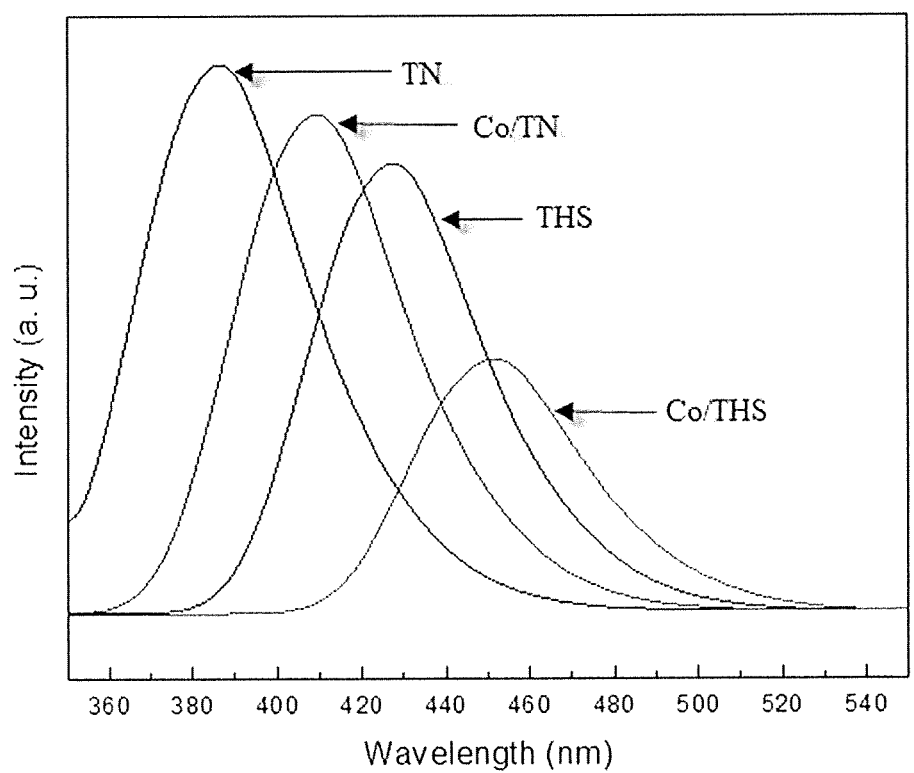
FIG. 7 is an overlay of photoluminescence emission spectra of titanium dioxide nanoparticles (TN), cobalt-doped titanium dioxide nanoparticles (Co/TN), titanium dioxide hollow spheres (THS), and cobalt-doped titanium dioxide hollow spheres (Co/THS).

Photoluminescence emission spectra of TN, Co/TN, THS, and Co/THS samples (FIG. 7) show the peak intensity decreases in the following order TN>Co/TN>THS>Co/THS. A red shift was also observed. These findings could be explained by the change in the structure of titanium dioxide from nanoparticles to hollow spheres and the incorporation of the cobalt ion into titanium dioxide lattice. The values of the band gap energy of TN, Co/TN, THS, and Co/THS samples calculated from the photoluminescence emission spectra were 3.2 eV, 3.02 eV, 2.88 eV, and 2.71 eV, respectively, confirming the values of the band gap energy calculated from the UV-Vis spectra.

Example 3 Photocatalytic Tests

An important application in which the synthesized catalyst can be used is hydrogen gas production from water splitting. In the experimental setup, a known weight of the photocatalyst was added into a 450-mL aqueous solution containing 10 vol % methanol as a scavenger. The reaction system was sealed and the experiments were conducted at room temperature and atmospheric pressure. The heat from the lamp was prevented from affecting the reaction by placing a jacketed cooler made of quartz between the reactor and lamp. A dispersion using an ultrasonic cleaner at 100 W for 15 min was carried out. The slurry was aerated with $N_2$ for 30 minutes and then irradiated with visible light generated from a 500 W Xenon lamp under continuous stirring. The evolved hydrogen gas generated from the reaction was analyzed by Agilent GC 7890A gas chromatography system using $N_2$ as the carrier gas. Blank reactions with illumination in the absence of the photocatalyst and with photocatalyst in the dark were carried out. Both cases yielded no evolution of hydrogen gas.

The type of the photocatalyst, the dose of the Co/THS photocatalyst, and the recycling and reusing of the Co/THS were studied.

Figure 8:
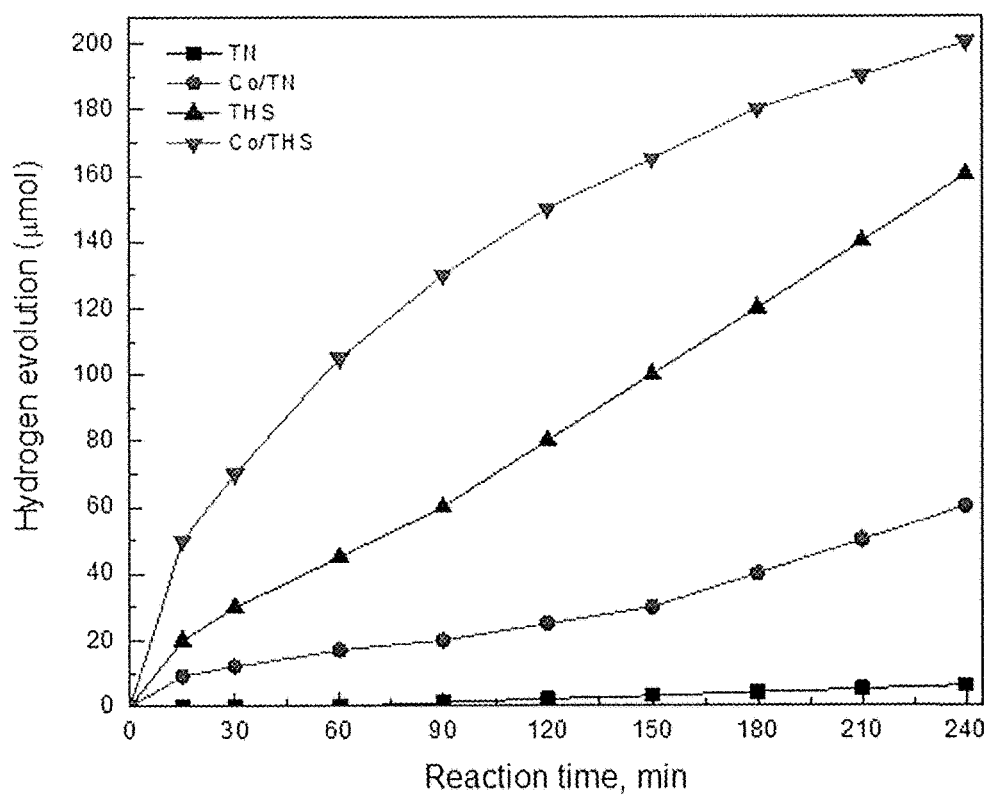
FIG. 8 shows the relationship between the photocatalyst and the amount of hydrogen gas evolved.

The effect of the type of photocatalyst on the amount of hydrogen gas evolved was studied under the following conditions: the light source was 500 W Xe lamp; the reaction time was 4 h; the dose of photocatalyst was 0.8 g/L; the volume of aqueous solution was 450 mL. FIG. 8 shows the effect of the type of photocatalyst on the amount of hydrogen gas evolved. The TN sample almost had no photocatalytic activity because TN absorbs in the UV region and the reaction was carried out under visible light. By doping TN with Co (i.e. the Co/TN sample), the amount of hydrogen gas evolved increased from 6 μmol to 60 μmol, due to a decrease of band gap of TN from 3.2 eV to 3.01 eV. By changing the physical structure of titanium dioxide from a nanoparticle to a hollow sphere, the amount of hydrogen gas evolved increased from 6 μmol to 160 μmol. By doping THS with Co (i.e. the Co/THS sample), the amount of hydrogen gas evolved increased from 160 μmol to 200 μmol. Therefore, the morphology of titanium dioxide affected the photocatalytic performance along with the doping of cobalt ions.

Figure 9:
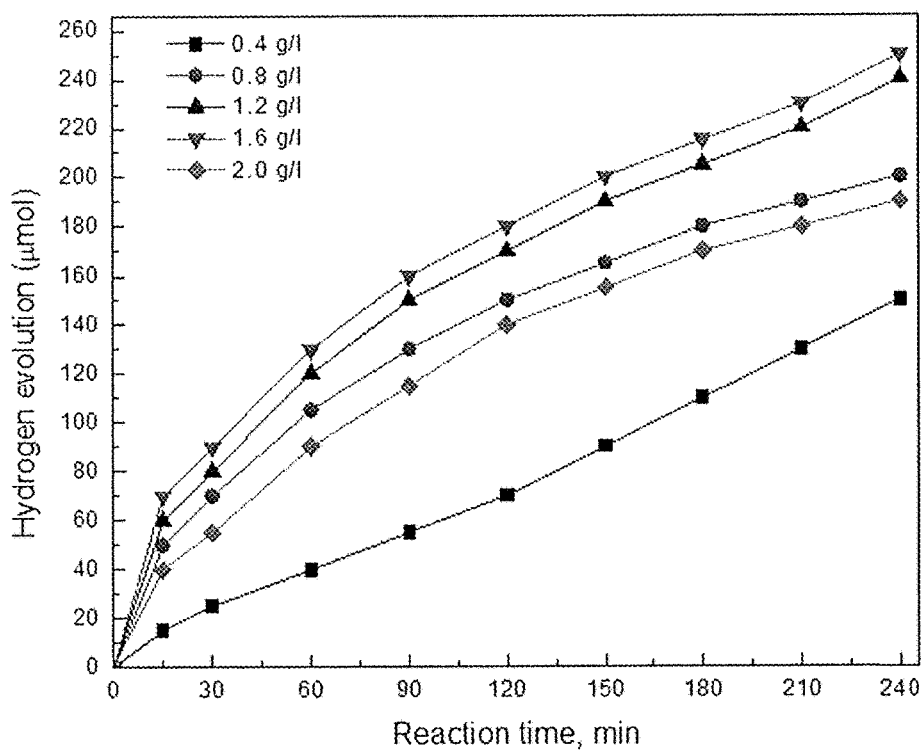
FIG. 9 shows the relationship between the amount of cobalt-doped titanium dioxide hollow spheres and the amount of hydrogen gas evolved in a water splitting experiment.

The effect of the dose of Co/THS photocatalyst on the amount of hydrogen gas evolved was studied under the following conditions: the light source was 500 W Xe lamp; the reaction time was 4 h; the dose of photocatalyst was varied from 0.4 to 2.0 g/L; the volume of aqueous solution was 450 mL. FIG. 9 shows the effect of the dose of Co/THS photocatalyst on the amount hydrogen gas evolved. The amount of hydrogen gas evolved increased from 150 μmol to 250 μmol by increasing the dose of Co/THS photocatalyst from 0.4 to 1.6 g/L, respectively. This observation could be explained by the increase in number of available sites for photocatalytic reaction as the dose increased, resulting in more photocatalytic activity. Upon increasing the dose of photocatalyst above 1.6 g/L, the amount of hydrogen evaluation dropped to 190 μmol. This observation could have resulted from a decrease in light penetration due to the high concentration of photocatalyst particles in the reaction solution.

Figure 10:
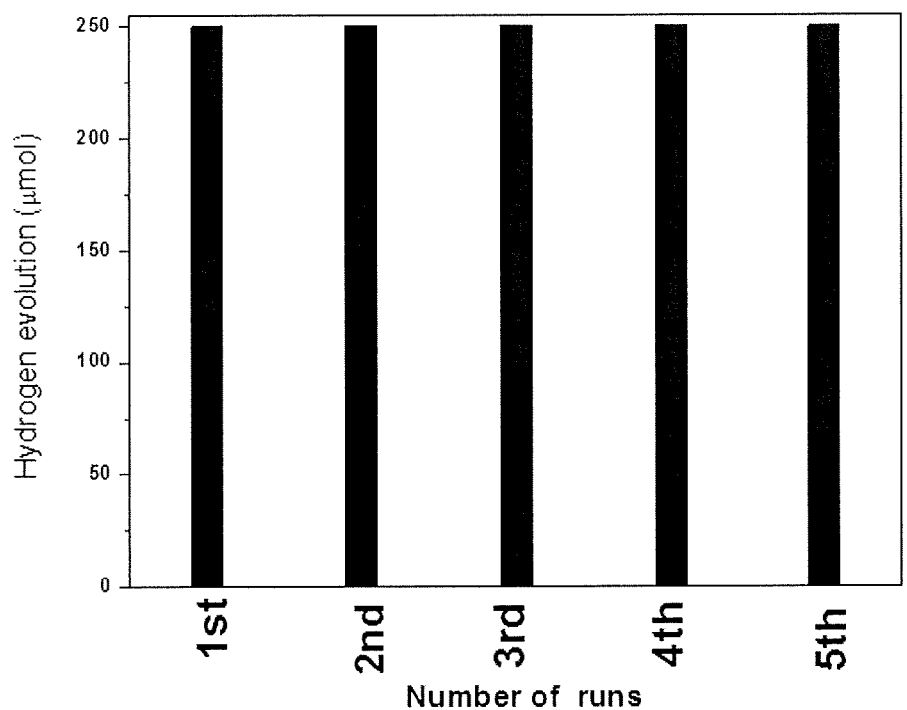
FIG. 10 shows the amount of hydrogen gas evolved in the presence of cobalt-doped titanium dioxide hollow spheres, which was recycled after each run and used in the subsequent run.

The recycling and reusing of Co/THS photocatalyst was studied under the following conditions: the light source was 500 W Xe lamp; the reaction time was 4 h; the dose of photocatalyst was 1.6 g/L; the volume of aqueous solution was 450 mL. FIG. 10 shows recycling and reusing the Co/THS photocatalyst does not affect the amount of hydrogen gas evolved. From FIG. 10, it is clear that Co/THS photocatalyst has photocatalytic stability and can be used and recycled many times.

The foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

The invention claimed is:

1. A composite hollow particle, comprising:
a shell comprising titanium dioxide and cobalt(II) ions; wherein:
the shell surrounds a hollow core,
a crystallite size of the titanium dioxide is in a range of 1-20 nm,
the cobalt(II) ions are located in the shell, and
the composite hollow particle is mesoporous with an average pore size in a range of 1-10 nm, has a BET surface area in a range of 100-200 $m^2/g$, and does not contain ferrite.

2. The composite hollow particle of claim 1, wherein an average shell thickness is in a range of 5-45 nm and an average core diameter is in a range of 100-300 nm.

3. The composite hollow particle of claim 1, wherein the titanium dioxide is in an anatase phase.

4. The composite hollow particle of claim 1, which does not contain zinc(II) and/or cadmium(II).

5. The composite hollow particle of claim 1, which comprises 1-40 wt % of the cobalt(II) ions, based on a total weight of the composite hollow particle.

6. A method for producing the composite hollow particle of claim 1, the method comprising:
dissolving a tetraalkyl titanate compound and a cobalt(II) salt in a solvent comprising nitric acid, an alcohol, and water, thereby forming a first mixture;
mixing the first mixture with cyclohexylamine thereby forming a second mixture; and
heating the second mixture in an autoclave thereby forming the composite hollow particle.

7. The method of claim 6, wherein second mixture is heated at a temperature in a range of 60-100° C. for 12-48 hours.

8. The method of claim 6, wherein the tetraalkyl titanate compound is selected from the group consisting of tetrabutyl titanate, tetramethyl titanate, tetraethyl titanate, tetraisopropyl titanate, and tetrakis(2-ethylhexyl) titanate.

9. The method of claim 6, wherein the cobalt(II) salt is selected from the group consisting of cobalt(II) chloride, cobalt(II) acetate, cobalt(II) nitrate, cobalt(II) sulfate, cobalt(II) bromide, cobalt(II) iodide, and hydrates thereof.

10. The method of claim 6, wherein an amount of the cobalt(II) salt is in a range of 10-50 mol %, based on a number of moles of the tetraalkyl titanate compound.

11. The method of claim 6, wherein a volume of the nitric acid is in a range of 1-20 vol %, based on a volume of the water.

12. The method of claim 6, wherein an amount of the cyclohexylamine is in a range of 5-30 mol %, based on a number of moles of the tetraalkyl titanate compound.

13. A method for producing hydrogen gas, the method comprising:

mixing the composite hollow particle of claim 1 with a solution comprising water and an alcohol thereby forming a slurry; and irradiating the slurry with light with a wavelength in a range of 385-740 nm, thereby producing hydrogen gas.

14. The method of claim 13, wherein an amount of the composite hollow particle in the slurry is in a range of 0.1-5 g/L.

15. The method of claim 13, wherein the alcohol is methanol.

16. The method of claim 13, wherein the solution comprises up to 30 vol % of the alcohol, based on a total volume of the solution.

17. The method of claim 13, wherein the hydrogen gas is produced at a rate in a range of 50-300 μmol/h per gram of the composite hollow particle.

18. The method of claim 13, further comprising:

recovering the composite hollow particle after the hydrogen gas is produced; and recycling the recovered composite hollow particle, which maintains photocatalytic activity after being recycled for at least 4 reaction cycles.

19. The composite hollow particle of claim 1, wherein the cobalt(II) ions are incorporated within a lattice of the titanium dioxide.

20. The composite hollow particle of claim 1, which does not contain cobalt oxide.

21. The composite hollow particle of claim 1, wherein the shell consists of titanium dioxide and cobalt(II) ions.

22. The composite hollow particle of claim 1, which comprises 1-15 wt % of the cobalt(II) ions, based on a total weight of the composite hollow particle.

\* \* \* \* \*